US007535664B1

(12) United States Patent
Gill

(10) Patent No.: US 7,535,664 B1
(45) Date of Patent: May 19, 2009

(54) PERFORMANCE ENHANCEMENT FOR TAPE WRITE IMMEDIATE OPERATIONS

(75) Inventor: Richard Allen Gill, Arvada, CO (US)

(73) Assignee: Storage Technology Corporation, Louisville, CO (US)

( * ) Notice: Subject to any disclaimer, the term of this patent is extended or adjusted under 35 U.S.C. 154(b) by 350 days.

(21) Appl. No.: 10/712,074

(22) Filed: Nov. 13, 2003

(51) Int. Cl.
*G11B 5/09* (2006.01)

(52) U.S. Cl. .................. 360/50; 360/72.1; 360/72.2; 360/77.12

(58) Field of Classification Search .......... 360/31, 360/53, 75
See application file for complete search history.

(56) References Cited

U.S. PATENT DOCUMENTS

| 5,210,829 | A | * | 5/1993 | Bitner ................... 710/57 |
| 5,321,558 | A | * | 6/1994 | Tackett .................. 360/39 |
| 5,373,401 | A | * | 12/1994 | Bentley et al. ........... 360/50 |
| 5,408,366 | A | * | 4/1995 | Bentley et al. ........... 360/53 |
| 5,712,740 | A | * | 1/1998 | Kikuchi et al. ........... 360/48 |
| 5,892,633 | A | * | 4/1999 | Ayres et al. ............ 360/73.08 |
| 5,995,306 | A | * | 11/1999 | Contreras et al. ......... 360/31 |
| 6,034,831 | A | * | 3/2000 | Dobbek et al. ............ 360/31 |
| 6,118,605 | A | * | 9/2000 | Call et al. .............. 360/50 |
| 6,307,701 | B1 | * | 10/2001 | Beavers et al. ........... 360/53 |
| 6,546,456 | B1 | * | 4/2003 | Smith et al. ............. 711/112 |
| 6,628,466 | B2 | * | 9/2003 | Alex .................... 360/31 |
| 6,768,604 | B2 | * | 7/2004 | Anderson ............... 360/60 |
| 6,856,479 | B2 | * | 2/2005 | Jaquette et al. .......... 360/48 |
| 6,970,311 | B2 | * | 11/2005 | Jaquette ................ 360/46 |
| 2003/0142429 | A1 | * | 7/2003 | Ataku et al. ............ 360/51 |
| 2004/0148462 | A1 | * | 7/2004 | Uysal et al. ............ 711/118 |

\* cited by examiner

*Primary Examiner*—Hoa T Nguyen
*Assistant Examiner*—Dismery E Mercedes
(74) *Attorney, Agent, or Firm*—Brooks Kushman, P.C.

(57) ABSTRACT

A method for writing data in a tape drive is provided by the present invention. The present invention provides a method for writing data in a tape drive. The invention include allocating a blank area for transpose writing on a magnetic tap and then writing a first group of data sets on the magnetic tape adjacent to the blank area. The tape drive maintains full operating speed during intervals between writing successive data sets, resulting in spaces between the data sets. At a specified interval, the drive repositions the tape writes a transposed data block to the allocated blank area, wherein the transposed data block contains the same content as the first group of data sets. A new blank area for transpose writing is then allocated adjacent to the recently transposed data block.

12 Claims, 3 Drawing Sheets

PERFORMANCE ENHANCEMENT FOR TAPE WRITE IMMEDIATE OPERATIONS

BACKGROUND OF THE INVENTION

1. Field of the Invention

The present invention relates generally to magnetic tape systems, and more specifically to dataset migration and backup for tape systems.

2. Background of the Invention

Many tape systems use dataset migration/backup. Host software for backup uses a channel command that instructs the tape drive to write the dataset to tape before any further data is sent from the host. Although this type of hand shaking for data transfer produces extremely slow transfers, many systems still use such software.

Product road maps for tape systems generally show an increase in host transfer rates. With these requirements and changes, high-density recording and fast tape speed are needed. As the full operating speed for tape drives increases, the time needed to accelerate and decelerate increases, as a way of keeping product costs down. The total time needed to decelerate, reposition and ramp up to full speed is known as the repositioning time. Though it is possible to reduce these times, such methods would also add considerable costs to the drives. Data cannot continue to be written until the repositioning of the tape is complete and the drive is back up to full operating speed. Full operating speed is a predefined tape speed at which data is written onto the tape. A data buffer usually masks this latent time so that the host never sees any performance degradation.

When the customer up-grades to a newer generation tape drive, certain expectations are present for the performance for which they are paying. This performance may be, for example, only capacity and throughput. When using software that uses the "Tape write immediate" command, throughput is actually decreased due to the increase in reposition time.

Therefore, it would be desirable to have a method for reducing the effects of repositioning times on total performance throughput.

SUMMARY OF THE INVENTION

The present invention provides a method for writing data in a tape drive. The present invention includes allocating a blank area for transpose writing on a magnetic tape and then writing a first group of data sets on the magnetic tape adjacent to the blank area. The tape drive maintains full operating speed during intervals between writing successive data sets, resulting in spaces between the data sets. At a specified interval, the drive repositions the tape and writes a transposed data block to the allocated blank area, wherein the transposed data block contains the same content as the first group of data sets. A new blank area for transpose writing is then allocated adjacent to the recently transposed data block. Allocating the new blank area may include erasing a portion of the first group of data sets.

The data used to write both the first group of data sets and the transposed data block is stored in a data buffer, which is used along with a specified data transfer to determine the size of the blank areas allocated for transpose writing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
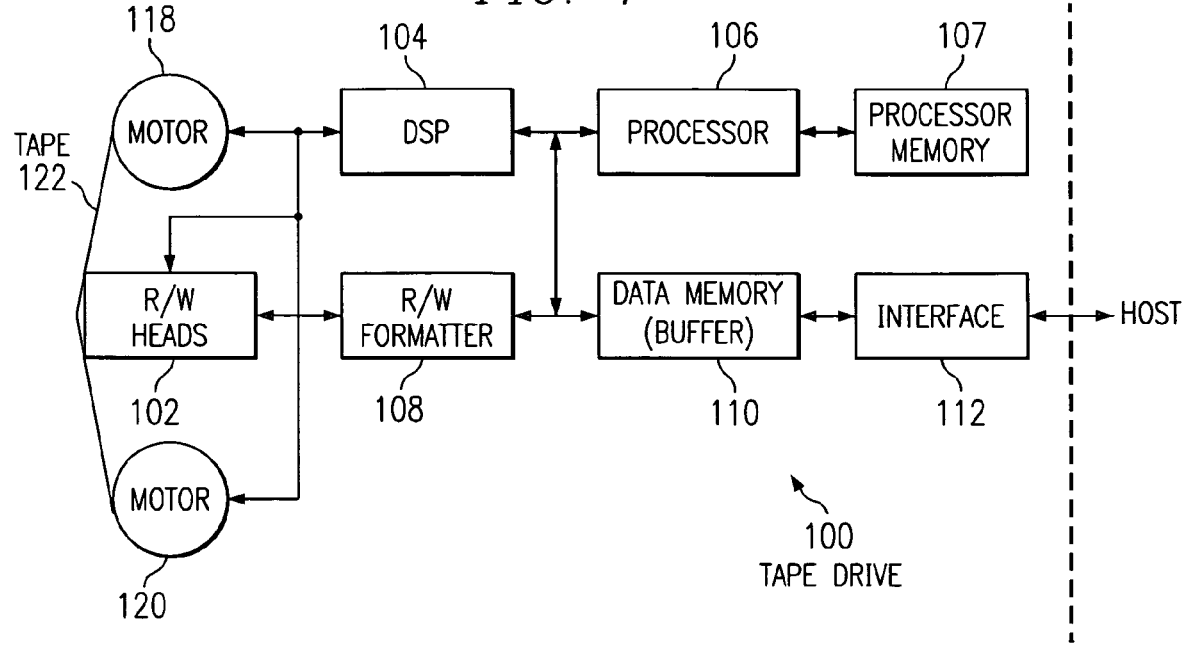
FIG. 1 depicts a block diagram of a tape drive in accordance with a preferred embodiment of the present invention.

With reference now to FIG. 1, a block diagram of a tape drive in accordance with a preferred embodiment of the present invention is depicted. Tape drive 100 is an example of a tape drive system in which the mechanism of the present invention for creating and reading data may be implemented. The mechanism allows for host data to be written on a magnetic tape in a manner that allows this data to be read by this or any other like tape drive.

As illustrated, tape drive 100 includes processor 106, digital signal processor (DSP) 104, read/write (R/W) heads 102, processor memory 107, read/write formatter 108, data memory 110, interface 112, and motors 118-120. Processor 106 executes instructions stored within processor memory 107 that control the functions of the other components within tape drive 100 such that read and write functions may be executed.

Interface 112 provides an interface to allow tape drive 100 to communicate with a host computer or with a host network. Motors 118-120, controlled by digital signal processor (DSP) 104, move tape 122 such that read/write heads 102 can read information from or write information to tape 122. Tape 122 is a magnetic tape in these examples.

Data memory 110 acts as a buffer to match the speed of the drive to the speed of the interface. During write operations, read-write channels 108 provides for the reliable conversion of digital data into analog signals that drive the elements of read/write head 102. Read/write head 102 creates magnetic patterns on tape 122 as it is moved past. The conversion process includes the generation and appending of error correcting data to the digital data stream that is used during readback to help ensure that data errors are detected and corrected.

During readback, R/W formatter 108 processes the analog head signals created by read/write head 102 as tape 122 is moved past. The formatter extracts the data, detects and corrects errors, and provides a digital data stream to data memory 110 and network interface 112.

Figure 2:
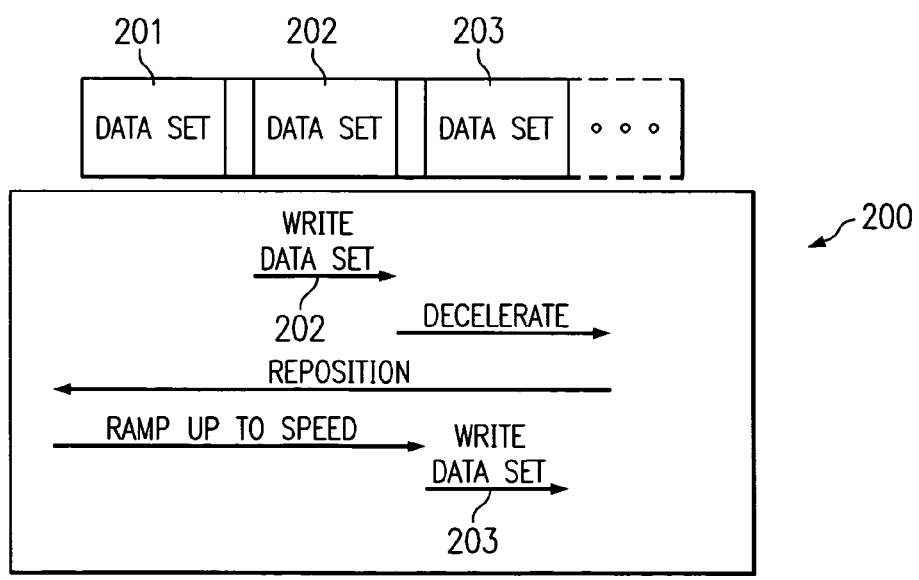
FIG. 2 depicts a diagram illustrating tape drive repositioning in accordance with the prior art.

Referring now to FIG. 2, a diagram illustrating tape drive repositioning is depicted in accordance with the prior art. When writing consecutive data sets 201, 202 and 203 on tape 200, there is a wait interval after writing a given data set, which is the time a host takes to begin writing another data set. This wait interval between writing sets results in blank space on the tape between the data sets. In order to minimize space between consecutive data sets 201-203, the tape drive must rewind the tape 200 between each write operation.

In the present example, after writing data set 202, the tape drive must decelerate the tape 200. Due to higher density data storage and increased tape speeds found in modern tapes drives, more time is needed to decelerate, which causes a considerable amount of tape 200 to pass over the write head before stopping.

After the tape 200 has stopped, the drive must reposition the tape by rewinding it. The drive rewinds the tape in order to return to the end of the last written data set in order to minimize blank space between the last data set and the next data set to be written (as explained above). However, because of the high full operating speed in modern tape drives, the drive cannot simply rewind to the beginning of the next data set position. Rather, as depicted in FIG. 2, the drive must reposition the tape 200 a considerable distance ahead of the intended beginning point of data set 203 in order to provide enough lead time to ramp up to full operating speed. The drive then writes the next data set 203.

The total time needed to decelerate, reposition and ramp up to full speed is known as the repositioning time. Though it is possible to reduce these times, such methods would also add considerable costs to the drives.

A typical prior art method for reducing the effects of repositioning time on total performance throughput is to lie to the host system about the data already being on tape. Some open system level drives do this to maintain performance. Unfortunately, in the enterprise market the datasets are immediately deleted from disk once the drive indicates that the data has been successfully written to tape. Therefore, in the example in FIG. 2, the host might delete data set 203 from disk before it is actually written to tape 200.

Figure 3:
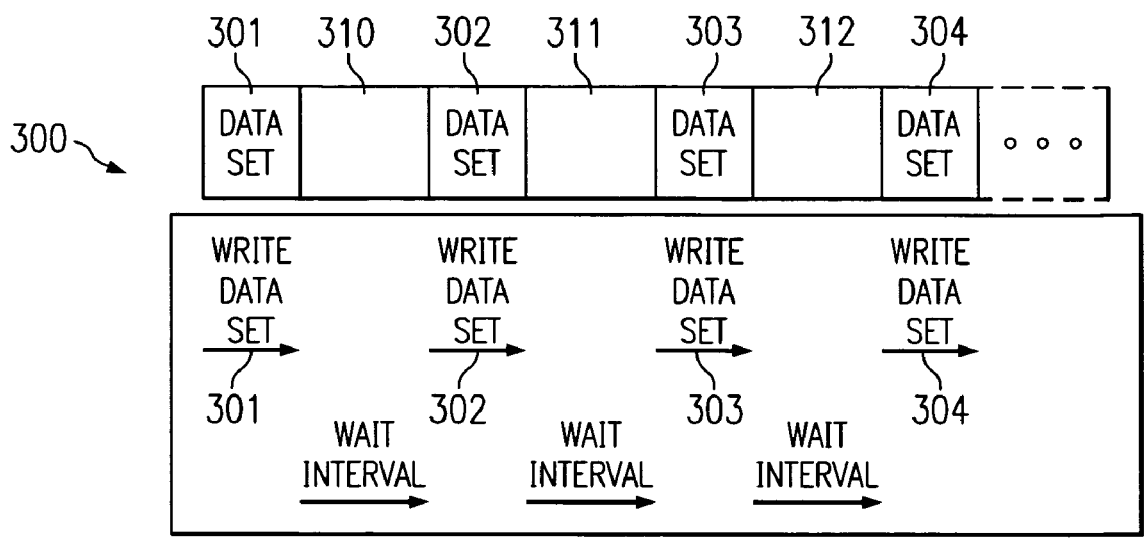
FIG. 3 depicts a diagram illustrating a write operation without a repositioning event in accordance with the prior art.

Referring to FIG. 3, a diagram illustrating a write operation without a repositioning event is depicted in accordance with the prior art. This alternate prior art method comprises writing data sets 301-304 to tape 300 while keeping the drive in motion, without a repositioning event. After the drive writes a data set, e.g., data set 301, it maintains full operating speed during the wait interval until the next data set 302 is written, and so on. Obviously, this method results in considerable gaps between the written data sets 301-304 that are equivalent in distance to the time the host takes to begin writing another data set. Although this method greatly reduces the throughput problem, it results in reduced capacity because of the large recording gaps on tape.

Figure 4:
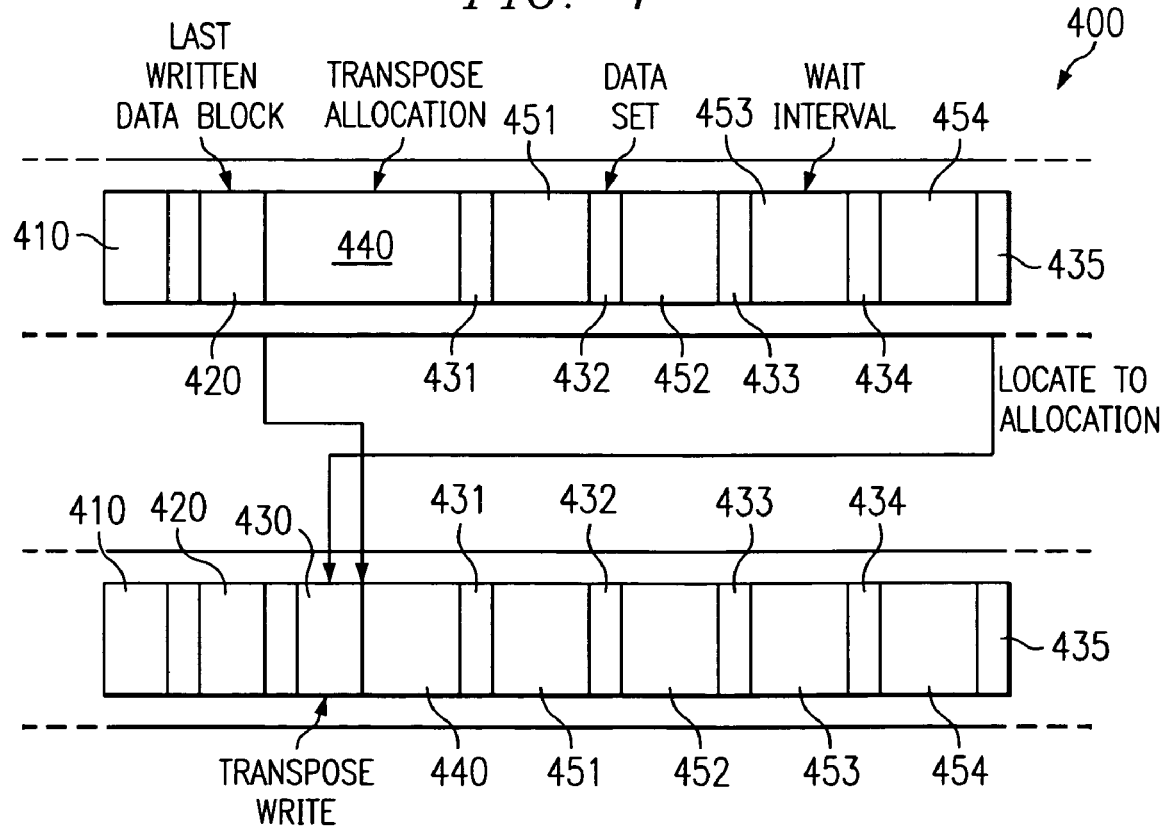
FIG. 4 depicts a diagram illustrating a method for maintaining throughput, while also maintaining capacity, in accordance with a preferred embodiment of the present invention.

Referring now to FIG. 4, a diagram illustrating a method for maintaining throughput, while also maintaining capacity, is depicted in accordance with a preferred embodiment of the present invention. The present invention comprises a two-step process.

In the present example, the tape 400 already has two completed data block 410 and 420. Adjacent to the last written data block 420 is a designated section 440, which is allocated for the future transposed writing of a new data block. The size of the allocation block is equal to the amount of data sets held in data memory 110. During the initial writing of new data, the drive continues moving at full speed while writing data sets 431, 432, 433, 434, and 435, without repositioning during the wait intervals. This process naturally produces gaps 451, 452, 453, and 454 between the data sets 431-435. Each data block in the data set is acknowledged back to the host and retained in data memory 110 in these illustrative examples.

After the initial data sets 431-435 are written, at a later time, the drive transposes the data into a data block 430 using data sets in data memory 110 and efficiency recording format without gaps. This data block 430 is written in the section 440 allocated for transpose writing, wherein data is rewritten from one location on the tape to another. Data blocks that are thus transposed are referred to as transposed data blocks. After the data has been transposed, the drive is free to overwrite the previously written data set 431-435. Thus, the present invention replaces multiple repositions, with a single one.

Figure 5:
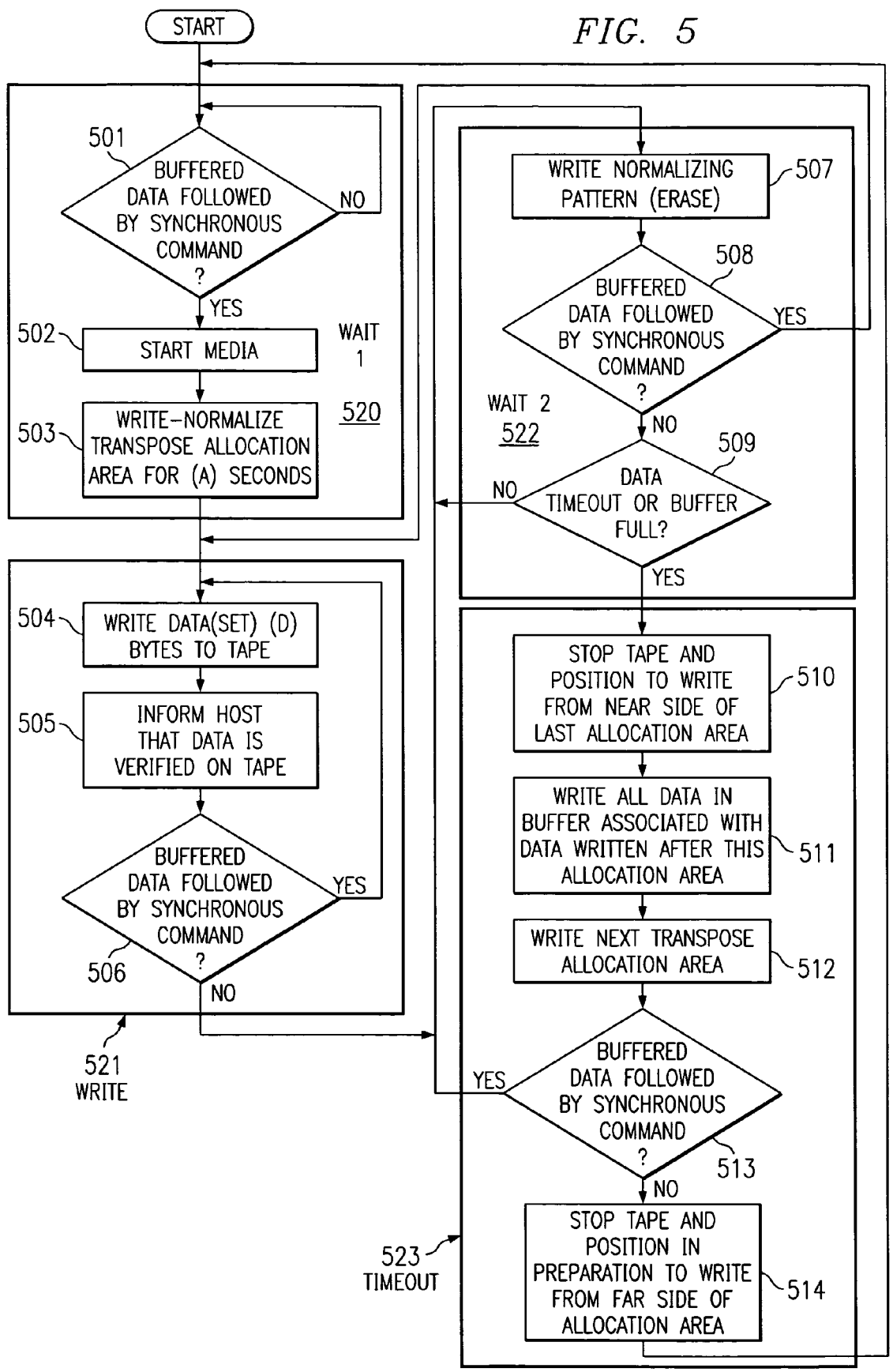
FIG. 5 depicts a flowchart illustrating the process of transposing data in accordance with a preferred embodiment of the present invention.

Referring to FIG. 5, a flowchart illustrating a process of transposing data is depicted in accordance with a preferred embodiment of the present invention. FIG. 5 explains the writing/transposing process illustrated in FIG. 4. The process is comprised of four modes.

The first cycle is the Wait 1 mode 520, which acts as a standby mode and prepares the tape drive to write and transpose. In the wait 1 mode 520, the drive continually checks for the presence of buffered data followed by a synchronous command (step 501). If no such data is present, the drive continues to monitor and wait. If buffered data with a synchronous command is detected, the drive starts the tape (step 502) and write normalizes the transpose allocation area, such as section 440 in FIG. 4, for a period equal to the data buffer size divided by the transfer rate (bytes/second) (step 503). The write normalization is essentially an erasure that prepares the allocation area for the future transposition of data (explained below).

The drive then enters the write mode 521, in which the buffered data set is written to tape, such as data set 431 in FIG. 4 (step 504). After the data is written to tape, the drive informs the host system that the data is verified on tape (step 505).

The drive again checks for buffered data followed by a synchronous command (step 506). If buffered data is present, the drive returns to step 504 and writes the data to tape.

If buffered data is not present, the drive enters the wait 2 mode 522, during which no data is written to tape, but the tape continues moving. Again, the drive writes a normalizing (erase) pattern (gap 451 in FIG. 4) during the wait interval (step 507) and checks for buffered data followed by a synchronous command (step 508). If new, buffered data is detected, the drive returns to write mode 521, and begins writing the data to tape, such as data set 432 in FIG. 4.

If no new data is detected, the drive determines if a data timeout is due (step 509). A timeout occurs if new, buffered data is not detected within a specified period of time. If the specified time has not yet elapsed and a timeout is not due, the drive returns to step 507 and continues writing the normalization pattern checking for new data. If the specified time period has lapsed without new data, the drive will enter the timeout mode 523 and begin transposing the data written during the previous steps.

In the timeout mode 523, the drive stops the tape and repositions to write from the near side (left side in FIG. 4) of the last allocation area (440) (step 510). The drive is now in position to transpose previously written data.

The drive then writes all data in the buffer that is associated with the data (i.e., data set 431, etc.) written past the allocation area (440) (step 511). After the transposed data (430) is written, the drive write normalizes a new allocation area for future transposition of data (step 512).

The drive again checks for new, buffered data followed by a synchronous command (step 513). If new data is present in the buffer, the drive returns to the wait 2 mode 522 in anticipation of more data writing. If no new data is detected in the buffer, the drive stops the tape and positions itself to write from the far side of the new allocation area (step 514) and then returns to wait 1 mode 520.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for writing data in a tape drive, the method comprising:
    allocating a blank area for transpose writing on a magnetic tape;
    writing a first plurality of data sets on the magnetic tape adjacent to the allocated blank area, wherein the tape drive maintains full operating speed during intervals between writing successive data sets, resulting in spaces between the data sets;
    identifying a data timeout wherein a data timeout occurs if buffered data are not detected within a specified period of time; and
    performing, in response to the data timeout, a single repositioning of the tape and writing a transposed data block to the allocated blank area, wherein the transposed data block contains the same content as the first plurality of data sets.

2. The method according to claim 1, further comprising allocating a second blank area for transpose writing adjacent to the transposed data block, wherein allocating the second blank area may include erasing a portion of the first plurality of data sets.

3. The method according to claim 1, wherein the data written to both the first plurality of data sets and the transposed data block is stored in a data buffer.

4. The method according to claim 3, wherein the size of the blank area allocated for transpose writing is determined by the size of the data buffer and a specified data transfer rate.

5. A tape drive, comprising:
    a means for allocating a blank area for transpose writing on a magnetic tape;
    a write head for writing a first plurality of data sets on the magnetic tape adjacent to the allocated blank area, wherein the tape drive maintains full operating speed during intervals between writing successive data sets, resulting in spaces between the data sets;
    a means for identifying a data timeout wherein a data timeout occurs if buffered data are not detected within a specified period of time; and
    a means for performing, in response to the data timeout, a single repositioning of the tape and writing a transposed data block to the allocated blank area, wherein the transposed data block contains the same content as the first plurality of data sets.

6. The tape drive according to claim 5, further comprising a means for allocating a second blank area for transpose writing adjacent to the transposed data block, wherein allocating the second blank area may include erasing a portion of the first plurality of data sets.

7. The tape drive according to claim 5, wherein the data written to both the first plurality of data sets and the transposed data block is stored in a data buffer.

8. The tape drive according to claim 7, wherein the size of the blank area allocated for transpose writing is determined to the size of the data buffer and a specified data transfer rate.

9. A computer readable medium encoded with a data structure for writing data in a tape drive, the computer readable medium comprising:
    first instructions for allocating a blank area for transpose writing on a magnetic tape;
    second instructions for writing a first plurality of data sets on the magnetic tape adjacent to the allocated blank area, wherein the tape drive maintains full operating speed during intervals between writing successive data sets, resulting in spaces between the data sets;
    third instructions for identifying a data timeout wherein a data timeout occurs if buffered data are not detected within a specified period of time; and
    fourth instructions for performing, in response to the data timeout, a single repositioning of the tape and writing a transposed data block to the allocated blank area, wherein the transposed data block contains the same content as the first plurality of data sets.

10. The computer readable medium according to claim 9, further comprising fifth instructions for allocating a second blank area for transpose writing adjacent to the transposed data block, wherein allocating the second blank area may include erasing a portion of the first plurality of data sets.

11. The computer readable medium according to claim 9, wherein the data written to both the first plurality of data sets and the transposed data block is stored in a data buffer.

12. The computer readable medium according to claim 11, wherein the size of the blank area allocated for transpose writing is determined by the size of the data buffer and a specified data transfer rate.

* * * * *